Patented Mar. 16, 1948

2,437,759

UNITED STATES PATENT OFFICE 2,437,759

PROCESS OF PYROLYZING ALPHA-PINENE TO ALLO-OCIMENE IN LIQUID PHASE

Theodore R. Savich and Leo A. Goldblatt, New Orleans, La., assignors to the United States of America as represented by the Secretary of Agriculture No Drawing. Application September 17, 1945, Serial No. 616,955

1 Claim. (Cl. 260—677)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to the production of dipentene and of allo-ocimene by pyrolysis of alpha-pinene, and has among its objects the production of these materials in a simple and economical manner resulting in relatively high yields.

Dipentene is useful as a source of isoprene used in the production of synthetic rubbers, resins and so forth. Allo-ocimene, a hydrocarbon possessing three double bonds in double conjugation, is very reactive and useful as a resin monomer, as a drying oil substitute, and as a starting material for the synthesis of many organic derivatives.

These two compounds have previously been formed in approximately equal yields of 40% each by passing the vapors of alpha-pinene through hot tubes either in the presence or absence of catalysts and with or without the use of a diluting gas. They have also been produced by mixing alpha-pinene with a high-boiling diluent and heating to temperatures of about 250° C. for 4 hours in the liquid phase and subsequently recovering the dipentene and allo-ocimene by steam distillation.

Alpha-pinene is a chief constituent of turpentine, and the latter may be used as the intermediate in the present process.

In general, according to the present invention, alpha-pinene or turpentine is kept in the liquid phase and in a continuous process is pumped through a closed reactor maintained at temperatures of about from 275° to 500° C. Under these conditions, the alpha-pinene or turpentine builds up a pressure of about from 200 pounds to 700 pounds per square inch. The feed rate is maintained at liquid space velocities of about from 2 to 20,000 volumes per hour (that is, a volume of pinene up to about 20,000 times the volume of the reactor is introduced into the reactor each hour), the higher rates of feed being used at the higher temperatures, the corresponding heating times being about from 30 minutes to 0.2 second. A temperature of about from 400° to 500° C. is preferred to give the higher yields of allo-ocimene, the corresponding feed rates being about from 480 to 20,000 volumes of the reactor per hour.

The physical constants of allo-ocimene are markedly different from those of alpha-pinene, and the extent of conversion to allo-ocimene is readily determined by examination of the physical constants, especially the refractive index.

The following examples exhibit the invention in greater detail:

Example I

In a typical case, alpha-pinene was pumped through the reactor at a temperature of approximately 460° C., the resulting pressure being approximately 500 pounds per square inch. Maximum conversion of allo-ocimene was obtained at a space velocity of approximately 2,000 volumes per hour, the corresponding heating time being approximately 2.0 seconds. Under these conditions, alpha-pinene having a rotation of +8.70 for the yellow sodium line at 20° C. in a 10 cm. tube, a refractive index of 1.4656 for the yellow sodium line, and a density of .859 grams per cc., gave a pyrolysate with a refractive index of 1.5074 and density of .827 grams per cc. The yields of allo-ocimene and dipentene were approximately 50% and 36%, respectively, the remainder being chiefly unchanged alpha-pinene, recyclized material and small amounts of polymer. The allo-ocimene and dipentene were readily recovered in a pure state by fractional distillation, since their boiling points are relatively far apart.

Data for the above example and other representative experiments using a similar intermediate are summarized in the following table:

| Example | Rate of feed of alpha-pinene in volumes of reactor per hour | Approximate corresponding heating time in seconds | Temperature (° C.) for maximum conversion to allo-ocimene | Refractive index of pyrolysate at 20° C. | Per cent yield of allo-ocimene |
|---|---|---|---|---|---|
| II | 36 | 100 | 325 | 1.4998 | 38 |
| III | 180 | 20 | 380 | 1.5039 | 43 |
| IV | 480 | 8 | 400 | 1.5058 | 47 |
| V | 660 | 5 | 413 | 1.5063 | 48 |
| VI | 960 | 4 | 427 | 1.5063 | 48 |
| I | 2000 | 2 | 460 | 1.5074 | 50 |
| VII | 6060 | 0.6 | 473 | 1.5078 | 51 |

In each experiment indicated in the table, the rate of feed was kept constant and the temperature varied. For each rate of feed, the temperature for maximum yield of allo-ocimene was established, and this is the temperature indicated in the table. The rates and temperatures given are for alpha-pinene fed into the reactor at room temperature. Using a preheater, which may be advantageous under certain conditions, would result for maximum conversion in a somewhat higher feed rate for a given temperature or a lower reaction temperature for a given feed rate.

The present process is of advantage over the prior art vapor phase process, in that the feed rate is approximately 300 times higher than with the vapor phase process, even when no diluting gas is used in the latter. Also, the disadvantage of charring and of resin formation commonly occurring in the reactors used in the vapor phase process is eliminated. In addition, there is a considerable saving in heat energy necessary to vaporize the alpha-pinene. Another advantage over both the prior art liquid phase and vapor phase processes is that the present process obtains conversion of allo-ocimene in greater yields. Also, it is simple than the prior art liquid phase process, since it is unnecessary to employ high-boiling diluents, and greater capacity of production for a given size reactor is obtained.

Having thus described the invention, what is claimed is:

A process of pyrolyzing alpha-pinene to allo-ocimene in the liquid phase, comprising feeding liquid alpha-pinene continuously through a closed reactor maintained at a temperature of about from 400° to 500° C. at a feed rate of about from 480 to 20,000 volumes of the reactor per hour, the higher rates of feed being used at the higher temperatures.

THEODORE R. SAVICH.
LEO A. GOLDBLATT.

REFERENCES CITED

The following references are of record in the file of this patent:

UNITED STATES PATENTS

| Number | Name | Date |
|---|---|---|
| 2,325,422 | Palmer et al. | July 27, 1943 |
| 2,384,482 | Martin | Sept. 11, 1945 |

OTHER REFERENCES

Bull. Soc. Chim. de France, Series 5, vol. 5, (1938), pages 322–326.

J. A. C. S., vol. 63, Dec. 1941, pages 3517–3522.

Gaponenkov, Russian J. Gen. Chem., 4, 1128–9 (1934).

J. A. C. S., vol. 51, Nov. 1929, pages 3464–3469.

J. A. C. S., 67, 242–5 (1945).

Arbusov, Berichte, vol. 67 (1934) 563, 569.